C. B. Clark,
Mop Head.
Nº 67,722.     Patented Aug. 13, 1867.
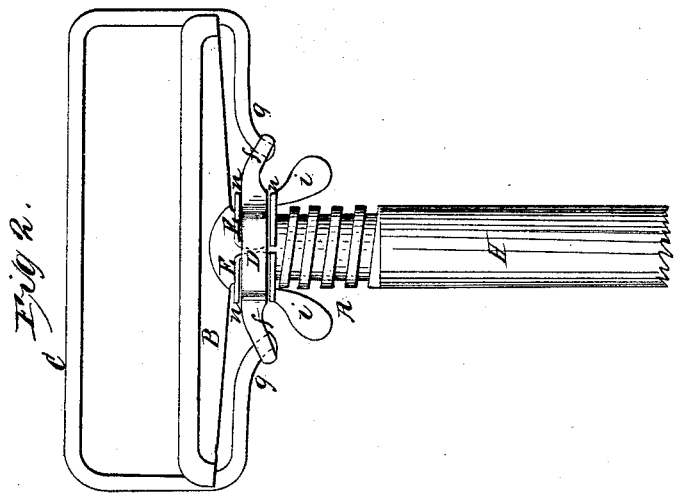
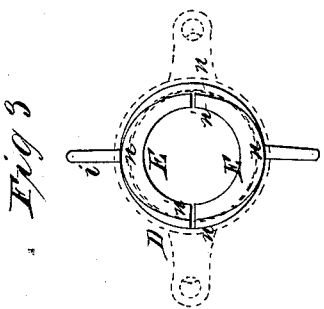
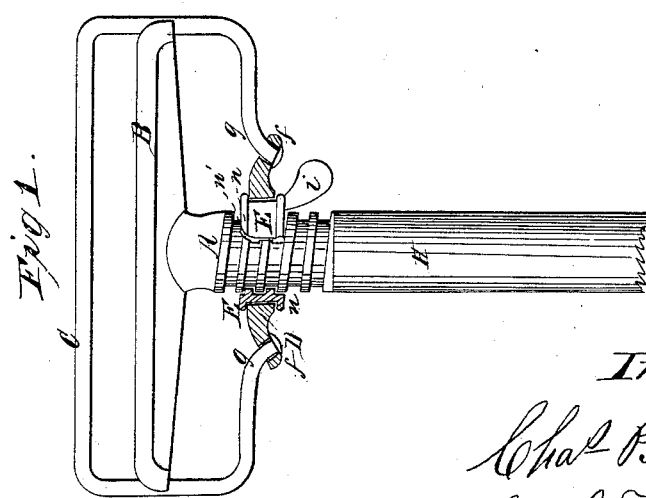
Witnesses.
Jay Hyatt,
L. Fraser.
Inventor.
Chas. B. Clark.
by J. Fraser & Co.
Attys

United States Patent Office.

CHARLES B. CLARK, OF BUFFALO, NEW YORK, ASSIGNOR TO HIMSELF AND EDWIN L. FERGUSON.

Letters Patent No. 67,722, dated August 13, 1867.

---

IMPROVED MOP-HEAD.

---

The Schedule referred to in these Letters Patent and making part of the same.

---

TO ALL WHOM IT MAY CONCERN:

Be it known that I, CHARLES B. CLARK, of the city of Buffalo, in the county of Erie, and State of New York, have invented a certain new and useful improvement in Mop-Heads; and I do hereby declare that the following is a full and exact description thereof, reference being had to the accompanying drawings, in which—

Figures 1 and 2 represent side elevations of my improvement, the collar and one-half of the nut being shown in section in the former.

Figure 3 is a detached view of the nut with the collar represented in red.

Like letters of reference designate similar parts.

My invention relates to that class of mop-heads in which the ends of the jaw or clamp-frame are secured to a collar that is connected with a nut, which, by screwing on a threaded shank at the end of the handle, adjusts the jaw-frame and clamps and releases the mop-cloth.

The invention consists in the peculiar inclination of the arms of the collar, in which the ends of the movable jaw-frame are fastened, and also in constructing the nut in two parts, whereby it is more readily connected with the collar, and more cheaply made, all as hereafter fully set forth.

In the drawings, A represents the screw-shank, with which is preferably cast the cross-head B. C is a jaw-frame, between which and the cross-head is clamped the mop-cloth. D is a collar, loosely surrounding the divided nut E E, so as to allow the latter to turn therein, and provided with lugs or short arms $f f$, in which the ends $g g$ of the jaw-frame are fastened, preferably by riveting. The nut is cast in two equal segments, E E, fig. 2, with internal threads that are continuous when the segments are united. They are also provided with thumb-pieces, $i\ i$, for turning the nut, and with an annular flange or ledge, $n\ n^2$, on each edge, which extends beyond the collar and secures it in place around the nut, as clearly represented.

To enable the portions of the nut to be inserted in the collar, I make the flange $n^2$ on the lower edge, or that opposite the thumb-pieces $i$, eccentric, as shown in fig. 3, which represents a bottom view of the nut, that is, the ends of the segments at the lower corners have no flange or projection, as shown at $n^1$, as it is evident that if the flange were concentric and extended the entire length of the segment, as that of the upper and opposite edge does, it would increase the diameter beyond that of the collar, which would prevent it being inserted within the same. The lower corners are also rounded, as shown, which, with the flange constructed as shown, enables the two segments to be readily arranged in place. The nut is then screwed on the shank A, when the handle H is inserted, and the ends $g$ of the jaw-frame riveted in the arms $f$. It is manifest that after the nut has been screwed on the shank, the connection between the segments and collar will be rendered secure against the possibility of displacement by the flanges $n\ n^2$, while the nut is as readily turned by means of its thumb-pieces, and operates the same, as if it were made in one piece in the ordinary manner. Instead of the flanges on the segments which embrace the collar, a single annular groove in the collar, with a flange on the segments fitting therein, will have the same effect, or other simple mechanical devices may be employed to hold the two together.

The arms $f f$, as usually constructed, extend at right angles from the collar, and the ends $g g$ of the jaw-frame inserted in holes formed therein in a line parallel with that of the handle. This construction allows the ends $g$, as soon as the joint becomes a little loose, to work and turn to a limited extent therein, which renders the head less firm, and greatly increases the wear at the joints. By constructing these arms so that they incline from a right angle and away from the cross-head, as shown, I overcome this difficulty, while they allow a shorter screw-shank to be used, (as shown in fig. 2,) where the nut is represented as screwed down till stopped by the cross-head. If the arms did not incline away from the cross-head the ends $g$ would come in contact therewith and prevent the further progress of the screw, and, as a consequence, require a longer shank in order to get the same traverse for the nut. The inclined arms also permit the insertion of the ends $g$ at an inclination of about forty-five degrees from the line of the handle, which prevents the ends turning, as before described. They also dispense with the necessity of such a sudden bend in the ends of the jaw-frame in order to connect with the arms, which renders the frame more firm, as the ends operate in the manner of a brace.

The mode of constructing the nut in halves enables it to be easily and cheaply cast, dispensing with the use of cores, and admits of its being readily adjusted, within the collar, thereby forming a neat, simple, and durable device.

What I claim as my invention is—

1. Forming the nut in segments, E E, to enable it to be inserted within the collar D, substantially in the manner and for the purpose set forth.

2. I also claim the bent or inclined arms $f$, in which the ends $g\ g$ of the jaw-frame are secured, substantially as and for the purpose specified.

In witness whereof I have hereunto signed my name in the presence of two subscribing witnesses.

C. B. CLARK.

Witnesses:
    JAY HYATT,
    ALBERT HAIGHT.